US011057171B2

(12) United States Patent
Chu et al.

(10) Patent No.: US 11,057,171 B2
(45) Date of Patent: Jul. 6, 2021

(54) METHOD AND APPARATUS FOR MU RESOURCE REQUEST (71) Applicant: NXP USA, Inc., Austin, TX (US)

(72) Inventors: Liwen Chu, San Ramon, CA (US); Lei Wang, San Diego, CA (US); Jinjing Jiang, San Jose, CA (US); Hongyuan Zhang, Fremont, CA (US); Hui-Ling Lou, Sunnyvale, CA (US)

(73) Assignee: NXP USA, Inc., Austin, TX (US)

(*) Notice: Subject to any disclaimer, the term of this patent is extended or adjusted under 35 U.S.C. 154(b) by 52 days.

(21) Appl. No.: 16/524,649

(22) Filed: Jul. 29, 2019

(65) Prior Publication Data
US 2019/0349150 A1 Nov. 14, 2019

Related U.S. Application Data (63) Continuation of application No. 15/629,435, filed on Jun. 21, 2017, now Pat. No. 10,367,614.
(Continued)

(51) Int. Cl.
H04W 28/02 (2009.01)
H04W 72/04 (2009.01)
(Continued)

(52) U.S. Cl.
CPC .......... H04L 5/0023 (2013.01); H04L 5/003 (2013.01); H04L 5/0055 (2013.01);
(Continued)

(58) Field of Classification Search
CPC ......... H04W 52/0238; H04W 74/0816; H04W 28/06; H04W 28/0278; H04W 72/10;
(Continued)

(56) References Cited

U.S. PATENT DOCUMENTS 8,649,358 B2 2/2014 Gong
9,439,219 B2 * 9/2016 Amini ................ H04W 74/002
(Continued)

FOREIGN PATENT DOCUMENTS

WO 2012/009205 A2 1/2012
WO 2015/031431 A1 3/2015

OTHER PUBLICATIONS

Liwen Chu et al., Orthogonal Frequency Division Multiple Access Resource Request, U.S. Appl. No. 15/019,768, filed Feb. 9, 2016.
(Continued)

Primary Examiner — Raj Jain (57) ABSTRACT

Aspects of the disclosure provide an apparatus for wireless communication. The apparatus includes a transceiver and a processing circuit. The transceiver is configured to transmit and receive wireless signals. The processing circuit is configured to configure a field within a data unit for buffer information report, determine a first scale factor for scaling a first value indicative of buffered traffic of a first category, and a second scale factor for scaling a second value indicative of buffered traffic of a category, configure the field to include the first scale factor with the first value and the second scale factor with the second value, and provide the data unit to the transceiver for transmitting to another apparatus that allocates resources for transmission between the two apparatuses.

16 Claims, 7 Drawing Sheets

Related U.S. Application Data (60) Provisional application No. 62/352,719, filed on Jun. 21, 2016.

(51) Int. Cl.
  *H04W 72/10* (2009.01)
  *H04W 74/00* (2009.01)
  *H04L 5/00* (2006.01)
  *H04W 28/06* (2009.01)
  *H04W 74/08* (2009.01)

(52) U.S. Cl.
  CPC ....... *H04W 28/0278* (2013.01); *H04W 28/06* (2013.01); *H04W 72/04* (2013.01); *H04W 72/0413* (2013.01); *H04W 74/0875* (2013.01); *H04W 72/0486* (2013.01); *H04W 72/10* (2013.01); *H04W 74/006* (2013.01)

(58) Field of Classification Search
  CPC ......... H04W 74/0241; H04W 72/0446; H04W 74/0875
  See application file for complete search history.

(56) References Cited

U.S. PATENT DOCUMENTS

| | | | |
|---|---|---|---|
| 9,769,846 B2 | 9/2017 | Kim | |
| 9,794,098 B2 | 10/2017 | Kwon | |
| 10,278,224 B2 | 4/2019 | Chu et al. | |
| 10,367,614 B2* | 7/2019 | Chu | H04L 5/0055 |
| 10,856,349 B2 | 12/2020 | Chu et al. | |
| 2007/0058662 A1 | 3/2007 | Yoshikawa | |
| 2007/0140168 A1* | 6/2007 | Laroia | H04W 24/08 |
| | | | 370/330 |
| 2008/0225756 A1 | 9/2008 | Amann | |
| 2013/0058220 A1 | 3/2013 | Yi et al. | |
| 2014/0071873 A1 | 3/2014 | Wang | |
| 2015/0023236 A1 | 1/2015 | Choi | |
| 2015/0036667 A1* | 2/2015 | El-Saidny | H04W 72/02 |
| | | | 370/336 |
| 2015/0063111 A1 | 3/2015 | Merlin et al. | |
| 2015/0063191 A1 | 3/2015 | Merlin et al. | |
| 2015/0063257 A1 | 3/2015 | Merlin et al. | |
| 2015/0063258 A1 | 3/2015 | Merlin et al. | |
| 2015/0063291 A1 | 3/2015 | Merlin et al. | |
| 2015/0063318 A1 | 3/2015 | Merlin et al. | |
| 2015/0063320 A1 | 3/2015 | Merlin et al. | |
| 2015/0245236 A1* | 8/2015 | Lu | H04W 52/241 |
| | | | 370/252 |
| 2015/0365940 A1 | 12/2015 | Chu et al. | |
| 2015/0382283 A1* | 12/2015 | Wang | H04W 52/02 |
| | | | 370/328 |
| 2016/0294530 A1 | 10/2016 | Merlin et al. | |
| 2016/0330753 A1* | 11/2016 | Jauh | H04W 72/10 |
| 2017/0041961 A1* | 2/2017 | Zou | H04W 74/0875 |
| 2017/0055287 A1* | 2/2017 | Yang | H04W 74/0808 |
| 2017/0127298 A1 | 5/2017 | Ryu | |
| 2017/0366312 A1 | 12/2017 | Chu | |
| 2018/0103491 A1* | 4/2018 | Sundman | H04W 52/0238 |

OTHER PUBLICATIONS

International Search Report and Written Opinion dated Sep. 29, 2017 in PCT/US2017/038589 filed Jun. 21, 2017 (with English translation).
U.S. Appl. No. 17/099,039, filed Nov. 16, 2020, 68 pages.

* cited by examiner

METHOD AND APPARATUS FOR MU RESOURCE REQUEST

INCORPORATION BY REFERENCE

This application is a continuation of and claims the benefit of U.S. application Ser. No. 15/629,435, filed on Jun. 21, 2017, which claims the benefit of U.S. Provisional Application No. 62/352,719, "MU RESOURCE REQUEST, TID SELECTION, AND RESPONDING RULES" filed on Jun. 21, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless local area network (WLAN) is used in home, school, office building, store, shopping mall and the like to link two or more devices using wireless connections within a limited area to a network. The WLAN allows users to move around within the limited area and still be connected to the network. In addition, the WLAN can be configured to provide connections to other network, such as, a wide area network, Internet and the like. Generally, WLANs are implemented based on standards, such as IEEE 802.11 standards, and the like.

SUMMARY

Aspects of the disclosure provide an apparatus for wireless communication. The apparatus includes a transceiver and a processing circuit. The transceiver is configured to transmit and receive wireless signals. The processing circuit is configured to configure a field within a data unit for buffer information report, determine a first scale factor for scaling a first value indicative of buffered traffic of a first category, and a second scale factor for scaling a second value indicative of buffered traffic of a category, configure the field to include the first scale factor with the first value and the second scale factor with the second value, and provide the data unit to the transceiver for transmitting to another apparatus that allocates resources for transmission between the two apparatuses.

In an example, the processing circuit is configured to set a control subfield with an identifier that is indicative of buffer information report. In another example, the first category and the second category respectively correspond to traffic priorities, and the processing circuit is configured to include traffic identifiers of the traffic priorities in the field.

In an embodiment, the first category includes multiple traffic priorities, and the processing circuit is configured to determine the first scale factor for scaling the first value that is indicative of a sum of buffered traffic of the multiple traffic priorities. In another embodiment, the data unit is a null frame that has no data field and has a quality of service (QoS) field that includes buffered traffic information of a specific traffic class that the data unit belongs to. Further, when the specific traffic class is one of the first traffic class and the second traffic class, the buffer information report in the field dominates the buffered traffic information of QoS field.

According to an aspect of the disclosure, the processing circuit is configured to aggregate the data unit with one or more other data units to generate an aggregated data unit, and provide the aggregated data unit to the transceiver for transmitting to the other apparatus.

Aspects of the disclosure provide a method for wireless communication. The method includes configuring, by an apparatus, a field within a data unit for buffer information report, determining a first scale factor for scaling a first value indicative of buffered traffic of a first category, and a second scale factor for scaling a second value indicative of buffered traffic of a category, including the first scale factor with the first value and the second scale factor with the second value in the field within the data unit, and transmitting wireless signals carrying the data unit to another apparatus that allocates resources for transmission between the two apparatuses.

Aspects of the disclosure provide a non-transitory computer readable medium storing program instructions for causing a processor in an apparatus to execute operations for communication. The operations include configuring, a field within a data unit for buffer information report, determining a first scale factor for scaling a first value indicative of buffered traffic of a first category, and a second scale factor for scaling a second value indicative of buffered traffic of a category, including the first scale factor with the first value and the second scale factor with the second value in the field within the data unit and providing the data unit to a transceiver circuit to transmit wireless signals carrying the data unit to another apparatus that allocates resources for transmission between the two apparatuses.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
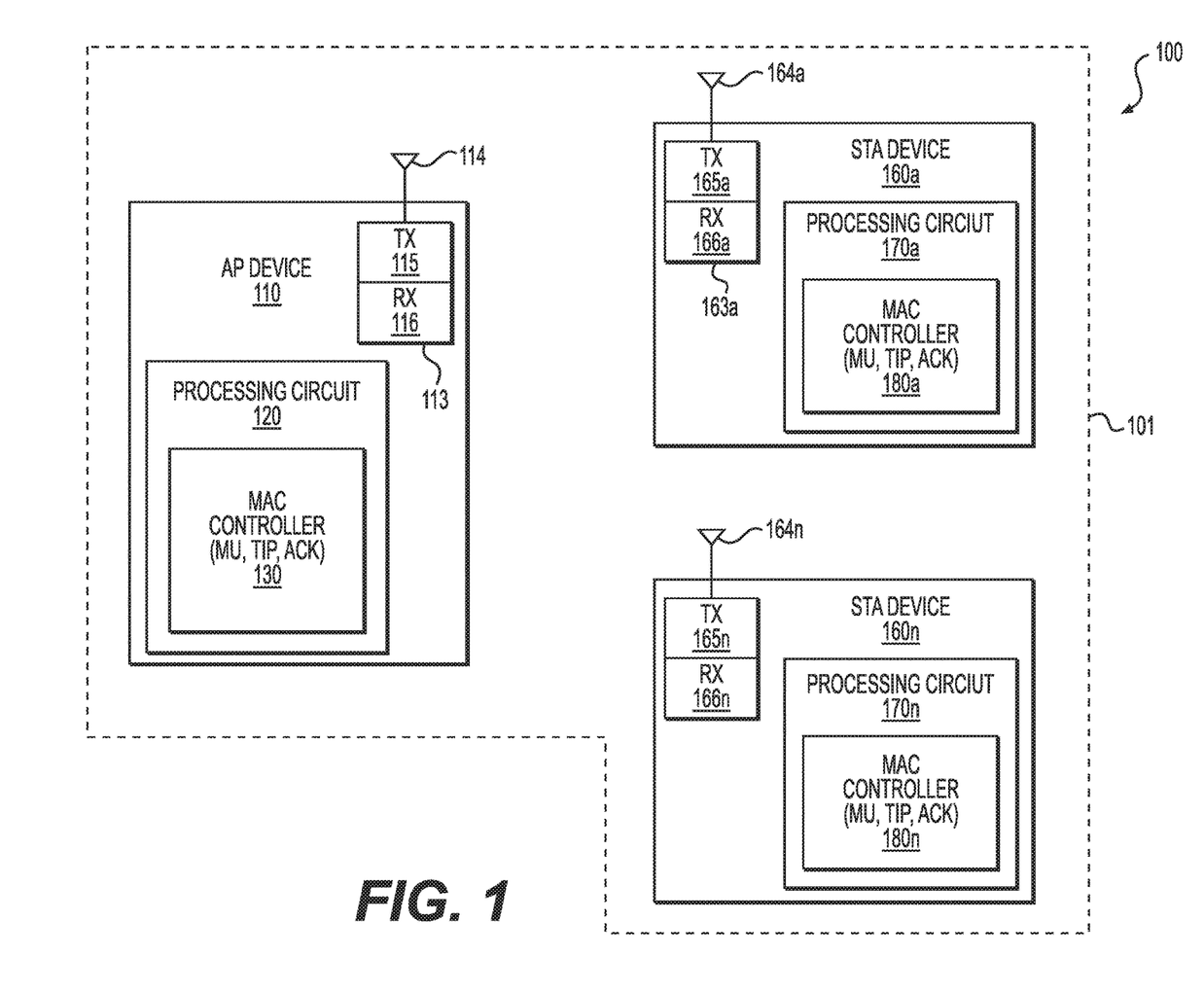
FIG. 1 shows a block diagram of a network 100 according to an embodiment of the disclosure.

FIG. 1 shows a block diagram of a network 100 according to an embodiment of the disclosure. The network 100 includes a first electronic device 110 and one or more second electronic devices 160a-160n that conduct wireless communication in a central coordinated manner to enable multi-user (MU) downlink and/or uplink transmissions. In the FIG. 1 example, the first electronic device 110 is a central coordinating device configured to assign resources (e.g., time, frequency, resource element, resource unit) of a communication channel for transmission between the first electronic device 110 and the second electronic devices 160a-160n, and coordinate multi-user downlink and/or uplink transmission between the first electronic device 110 and the second electronic devices 160a-160n. Further, the first electronic device 110 and the second electronic devices 160a-160n are configured to perform various operations, such as multi-user resource requests, traffic class selections, and the like to support the MU downlink and/or uplink transmission, and improve spectral efficiency.

The network 100 includes interconnections that are implemented using any suitable network technology, such wired, wireless, a local area network (LAN), a wireless LAN (WLAN), a fiber optical network, a wide area network (WAN), a peer-to-peer network, the Internet, and the like. In an example, the first electronic device 110 and the second electronic devices 160a-160n are in a basic service set (BSS) 101 that is implemented using WLAN technology to interconnect the first device 110 and the second devices 160a-160n. The network 100 includes other suitable interconnections (not shown), such as a LAN, a fiber optical network, and the like to provide connections for the BSS 101 to be connected to for example Internet.

In an embodiment, the BSS 101 is an infrastructure type basic service set. The first electronic device 110 is an access point (AP) device, and the second electronic devices 160a-160n are station (STA) devices. The second electronic devices 160a-160n communicate through the first device 110, and the first device 110 includes network hardware and software configured to serve as a bridge to allow wireless compliant devices, such as the second electronic devices 160a-160n to connect to other part of the network 100.

Each of the second electronic devices 160a-160n in the network 100 can be any suitable device, such as a desktop computer, a laptop computer, a tablet computer, a smart phone, a personal digital assistant (PDA), a smart watch, a smart camera, a smart TV, a smart voice recorder, a wearable device, a sensor, and the like. According to an aspect of the disclosure, the second electronic devices 160a-160n in the network 100 are implemented using the same version or different versions of a wireless standard, such as various IEEE 802.11 standards.

In the FIG. 1 example, the second electronic devices 160a-160n share resources of a communication channel for a transmission, and the first electronic device 110 is configured to assign the resources of the transmission (e.g., time, frequency, resource element, resource unit) to data unit (e.g., frame) exchanges between the first electronic device 110 and the second electronic devices 160a-160n. The second electronic devices 160a-160n are configured to perform transmission according to the assigned resources. For example, at a time, the first electronic device 110 plans to transmit data units respectively to a group of second electronic devices among the second electronic devices 160a-160n. The group of second electronic devices involved in a transmission is referred to as targeted second electronic devices. The first electronic device 110 allocates resources of a transmission to the targeted second electronic devices, and performs a transmission to transmit data units respectively to the targeted second electronic devices in the same transmission according to the resource allocation of the transmission.

In another example, the first electronic device 110 schedules to receive data units respectively from targeted second electronic devices among the second electronic devices 160a-160n. The first electronic device 110 allocates resources of a transmission to the targeted second electronic devices. The targeted second electronic devices perform transmissions in a same time duration to respectively transmit data units to the first electronic device 110 according to resource allocation, and the first electronic device 110 receives the data units from the targeted second electronic devices in the same scheduled time duration for example.

According to an aspect of the disclosure, devices in the BSS 101, such as the first electronic device 110, the second electronic devices 160a-160n and the like are configured to transmit two or more data units using an aggregation technique. In an embodiment, the first electronic device 110 aggregates two or more media access control (MAC) protocol data units (MPDUs) to a same destination device (e.g., a second electronic device), and forms an aggregated MPDU (A-MPDU). For example, the first electronic device 110 collects Ethernet frames (e.g., data units) to the same destination device, and wraps each frame individually with a MAC header. Then the first electronic device 110 groups the wrapped frames into a larger frame. In the example, at the reception side, the destination device can selectively acknowledge individual Ethernet frames.

In another embodiment, one or more of the second electronic devices 160a-160n can aggregate two or more MPDUs to the first electronic device 110, and form an A-MPDU. For example, the second electronic device 160a and the second electronic device 160n respectively collect Ethernet frames (e.g., data units) and wrap each frame individually with a MAC header. Then the second electronic device 160a and the second electronic device 160n respectively group the wrapped frames into larger frames. In another embodiment, one or more of the second electronic devices 160a-160n transmit single MPDU to the first electronic device 110.

Generally, wireless communication traffic is classified into traffic classes according to priorities and the wireless communication traffic is buffered into queues (e.g., first-in-first-out queues) according to the traffic classes. In an embodiment, wireless communication traffic is first categorized into access categories based on the applications that generate the wireless communication traffic, and then each access category includes multiple traffic classes of different priorities. In an example, the traffic classes are identified using priorities as traffic identifiers (TIDs).

According to an aspect of the disclosure, devices in the BSS 101, such as the first electronic device 110, the second electronic devices 160a-160n and the like are configured to aggregate communication traffic from different traffic classes to improve transmission efficiency. In an example, the second electronic device 160a aggregates a first MPDU of a first traffic identifier, and a second MPDU of a second traffic identifier to form a first aggregated A-MPDU; and the second electronic device 160n aggregates a third MPDU of a third traffic identifier, and a fourth MPDU of a fourth traffic identifier to form a second aggregated A-MPDU. In the example, the first aggregated A-MPDU and the second aggregated A-MPDU are transmitted in synchronization respectively by the second electronic device 160a and the second electronic device 160n during a transmission opportunity (TXOP). In an example, the first traffic identifier is the same as the second traffic identifier. In another example, the first traffic identifier is different from the second traffic identifier. In another example, the traffic classes of the first aggregated A-MPDU are the same as the traffic classes of the second aggregated A-MPDU. In another example, the traffic classes of the first aggregated A-MPDU are different from the traffic classes of the second aggregated A-MPDU. In another embodiment, MPDUs from more than two traffic identifiers are aggregated in one A-MPDU.

Figure 3:
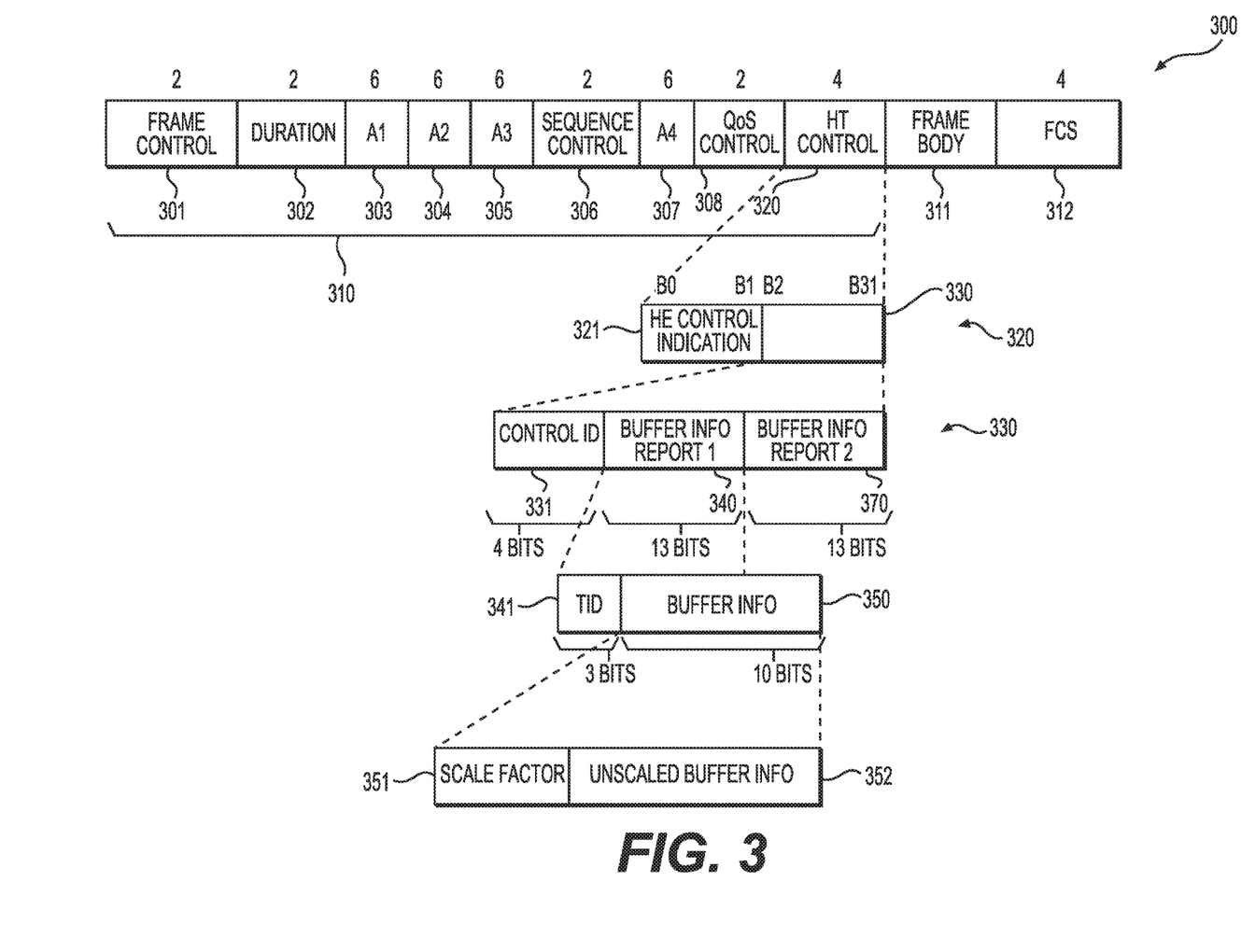
FIG. 3 shows a diagram of a data unit example 300 according to an embodiment of the disclosure.
Figure 4:
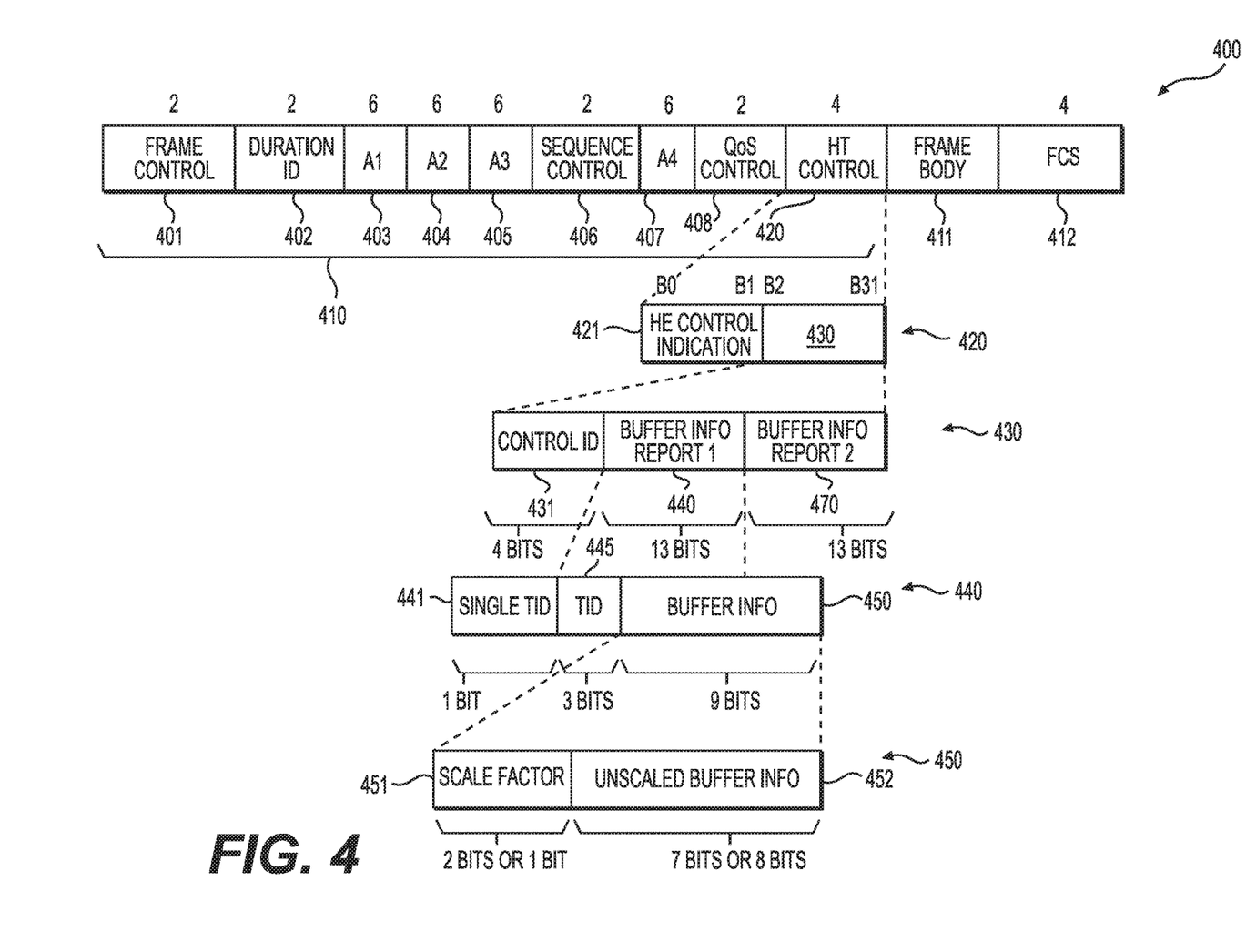
FIG. 4 shows a diagram of a data unit example 400 according to an embodiment of the disclosure.
Figure 5:
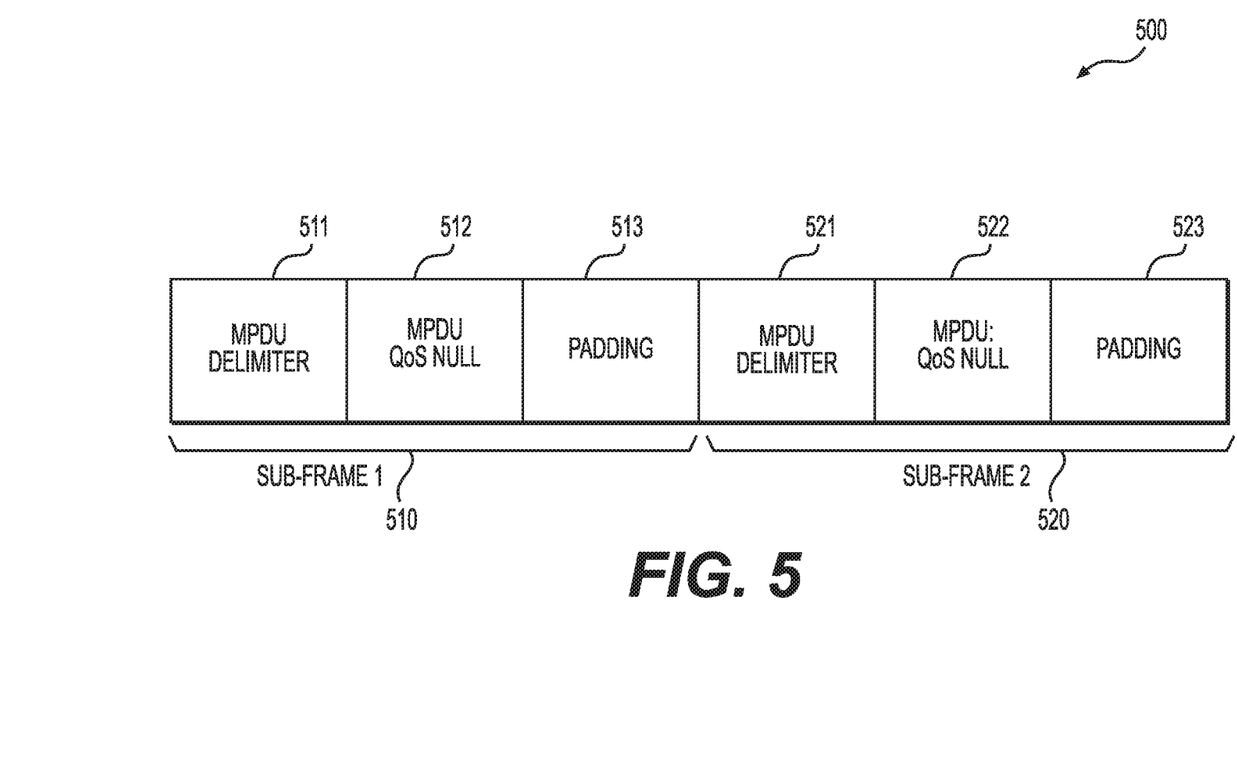
FIG. 5 shows a diagram of a data unit example 500 according to an embodiment of the disclosure.

According to an aspect of the disclosure, the first electronic device 110 is configured to select traffic classes in response to resource requests from the second electronic devices 160a-160n. In an embodiment, the second electronic devices 160a-160n are configured to efficiently use communication channel resource to provide the resource requests. In an example, the resource requests are provided in the form of buffer information reports. In the example, the second electronic devices 160a-160n are configured to send buffer report for two or more traffic classes in a data unit. Further, the second electronic devices 160a-160n are configured to aggregate multiple data units with buffer reports into an aggregated data unit, thus buffer reports for multiple traffic classes can be provided in one uplink transmission in an example. Examples of the data units that carry the buffer reports are shown in FIGS. 3-5, and will be discusses in detail with reference to FIGS. 3-5.

Specifically, in the FIG. 1 example, the first electronic device 110 includes a first transceiver circuit 113 and a first processing circuit 120 coupled together as shown in FIG. 1. In the example, the first transceiver circuit 113 includes a first receiving circuit 116 and a first transmitting circuit 115 that are both coupled to a first antenna 114, and the first processing circuit 120 includes a MAC controller 130 configured to perform MAC layer operations, such as processing MPDU and/or A-MPDU, extracting buffer information reports from aggregated A-MPDU, selecting traffic classes for multiple users, and the like.

The first transceiver circuit 113 is configured to receive and transmit wireless signals. For example, the first receiving circuit 116 is configured to generate electrical signals in response to captured electromagnetic waves by the first antenna 114, process the electrical signals to extract digital streams from the electrical signals. In an example, the first transmitting circuit 115 is configured to receive digital streams, such as management frames, data frames, and the like from for example the first processing circuit 120, generate radio frequency (RF) signals to carry the digital streams, and emit electromagnetic waves in the air via the first antenna 114 to transmit wireless signals that carry the digital streams.

The second electronic device 160a includes a second transceiver circuit 163a and a second processing circuit 170a coupled together. The second transceiver circuit 163a includes a second transmitting circuit 165a and a second receiving circuit 166a that are both coupled to a second antenna 164a. The second processing circuit 170a includes a MAC controller 180a configured to perform MAC layer operations, such as preparing buffer information reports, aggregating frames with buffer information reports, selecting traffic classes, generating MPDU and/or A-MPDU, and the like. Other second electronic devices are configured similarly as the second electronic device 160a.

The second transceiver circuit 163a is configured to receive and transmit wireless signals. For example, the second receiving circuit 166a is configured to generate electrical signals in response to captured electromagnetic waves by the second antenna 164a, process the electrical signals to extract digital streams from the electrical signals. In an example, the second transmitting circuit 165a is configured to receive digital streams, such as management frames, data frames, and the like from for example the processing circuit 170a, generate radio frequency (RF) signals to carry the digital streams, and emit electromagnetic waves in the air via the second antenna 164a to transmit wireless signals that carry the digital streams.

According to an aspect of the disclosure, the MAC controller 180a is configured to generate a data unit to carry buffer information for two or more traffic classes to allow the data unit to carry more buffer information to the first electronic device 110, and thus to improve communication efficiency. In an example, the MAC controller 180a counts the length (e.g., the number of bytes) of unacknowledged data units in a buffer that buffers data units for a traffic class. The length of unacknowledged data units in the buffer is indicative of pending uplink traffic, and is used as buffer information to request resource for uplink transmission.

In an embodiment, the MAC controller 180a is configured to determine a scale factor for the length information, thus the length information is provided with a reduced number of bits, thus length information for more traffic classes can be carried in one data unit. In another embodiment, the MAC controller 180a is configured to sum the length information of multiple traffic classes, and let the data unit to carry the summed length information. In another embodiment, the MAC controller 180a is configured to aggregate two or more data units with buffer information of different traffic classes into one aggregated data unit, thus the aggregated data unit carries buffer information for more traffic classes. Examples of the data units that carry the buffer information of two or more traffic classes are shown in FIGS. 3-5, and will be discusses in detail with reference to FIGS. 3-5.

Figure 6:
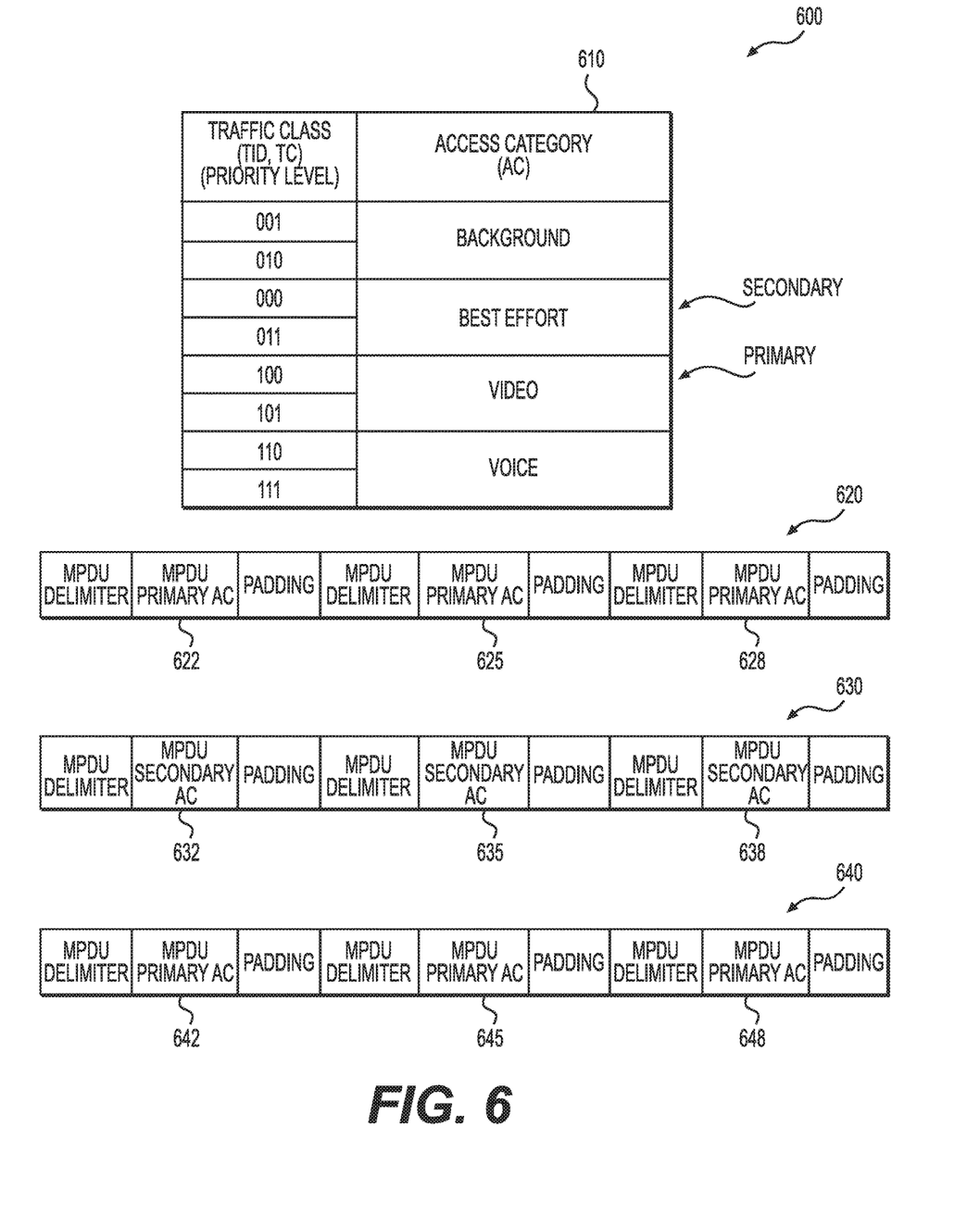
FIG. 6 shows a diagram 600 for traffic selection according to an embodiment of the disclosure.

Further, according to an aspect of the disclosure, the MAC controller 130 and the MAC controller 180a-180n are configured to aggregate data units (e.g., MPDUs) from selected traffic classes to generate an aggregated data unit (e.g., A-MPDU). In an embodiment, a primary access category is selected by an AP device (e.g., the first electronic device 110), a secondary access category is selected by the AP device or a STA device (e.g., the second electronic device 160a). The MAC controller 130 and the MAC controller 180a-180n are configured to aggregate data units from the primary access category, or aggregate data units from the secondary access category, or aggregate data units from the primary access category and the secondary access category. Examples of the aggregated data units are shown in FIG. 6, and will be discusses in detail with reference to FIG. 6.

Figure 7:
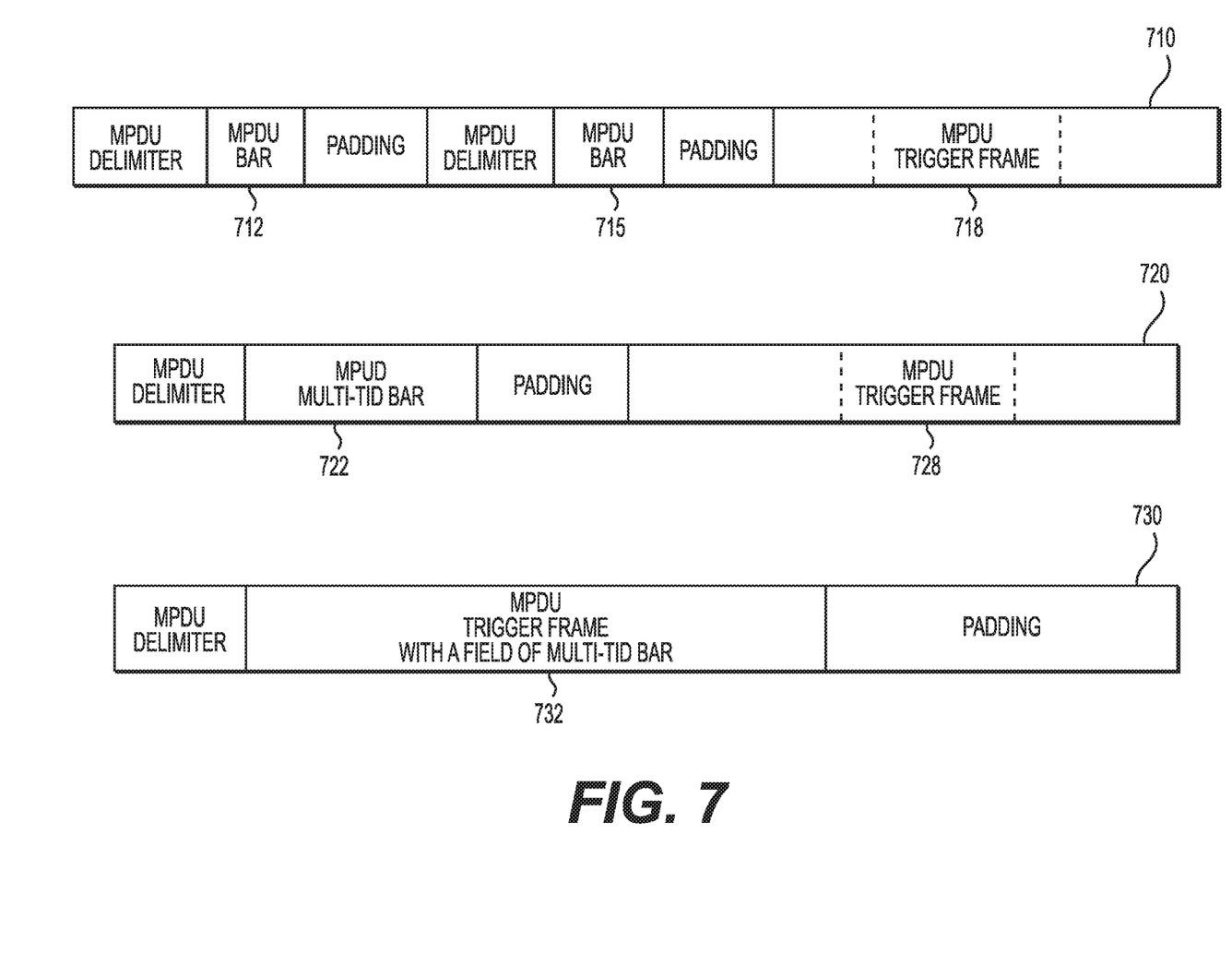
FIG. 7 shows a diagram 700 for block acknowledgement request according to an embodiment of the disclosure.

Further, according to an aspect of the disclosure, the MAC controller 130 is configured to generate a data unit to carry block acknowledgement requests for multiple traffic classes. In an example, the MAC controller 130 aggregates multiple block acknowledgement request frames respectively for multiple traffic classes into a larger frame. In another example, the MAC controller 130 generates a frame that carries a multi-TID block acknowledgement request. In another example, the MAC controller 130 inserts a multi-TID block acknowledgement request in a field of a frame, such as a field in a trigger frame. Examples of the data units are shown in FIG. 7, and will be discusses in detail with reference to FIG. 7.

According to another aspect of the disclosure, when an STA device is scheduled by the AP device in multi-user transmission, the STA device enters a low priority EDCA state; when the STA device is not scheduled by the AP device in multi-user transmission, the STA device enters a high priority EDCA state. In the high EDCA state, the STA device uses EDCA to gain transmission chance for traffic classes, and EDCA for high priority traffic classes can gain higher transmission chances. In an embodiment, when the STA device is in the low priority EDCA state, the STA device is allowed to transmit urgent MPDUs, such as management frames for voice access category, block acknowledgement request frames, and the like using EDCA for high priority traffic classes.

According to another aspect of the disclosure, an AP device, such as the first electronic device 110, and the like, can determine the scheduled/non-scheduled operation mode for the BSS 101, and can announce the scheduled/non-scheduled operation mode using beacon/management frame. In an example, the AP device is configured to determine both the scheduled and the non-scheduled operation mode for the BSS 101. For example, when the AP device announces non-scheduled operation mode, all the STA devices enter the non-scheduled operation mode; and when the AP devices announces scheduled operation mode, all the STA devices enter the scheduled operation mode.

In an example, the AP device is configured to determine the non-scheduled operation mode for the BSS 101, and the STA devices have the flexibility to determine operation mode. For example, when the AP device announces non-scheduled operation mode, all the STA devices enter the non-scheduled operation mode; and when the AP devices announces scheduled operation mode, each STA device determines and enters either scheduled operation mode or non-scheduled operation mode, and informs the AP device via announcement. In another example, the AP device is configured to determine respective operation modes for the STA devices, and inform the operation modes to the STA devices.

In an embodiment, the first electronic device 110 and the second electronic devices 160a-160n are implemented according to an open systems interconnection model (OSI model) with a plurality of layers, such as a physical (PHY) layer, a media access control (MAC) layer, a network layer, and the like from bottom up. In an example, the PHY layer includes transceiver circuits and baseband processing circuits in the processing circuits. In an embodiment, the MAC controller 130 and the MAC controllers 180a-180n are implemented in the MAC layer using circuits. In another embodiment, the MAC controller 130 and the MAC controllers 180a-180n are implemented as processors executing software instructions.

It is noted that while single antenna per device is used in the FIG. 1 example, the network 100 can be suitably modified to use multiple input, multiple output (MIMO) antenna technology.

Figure 2:
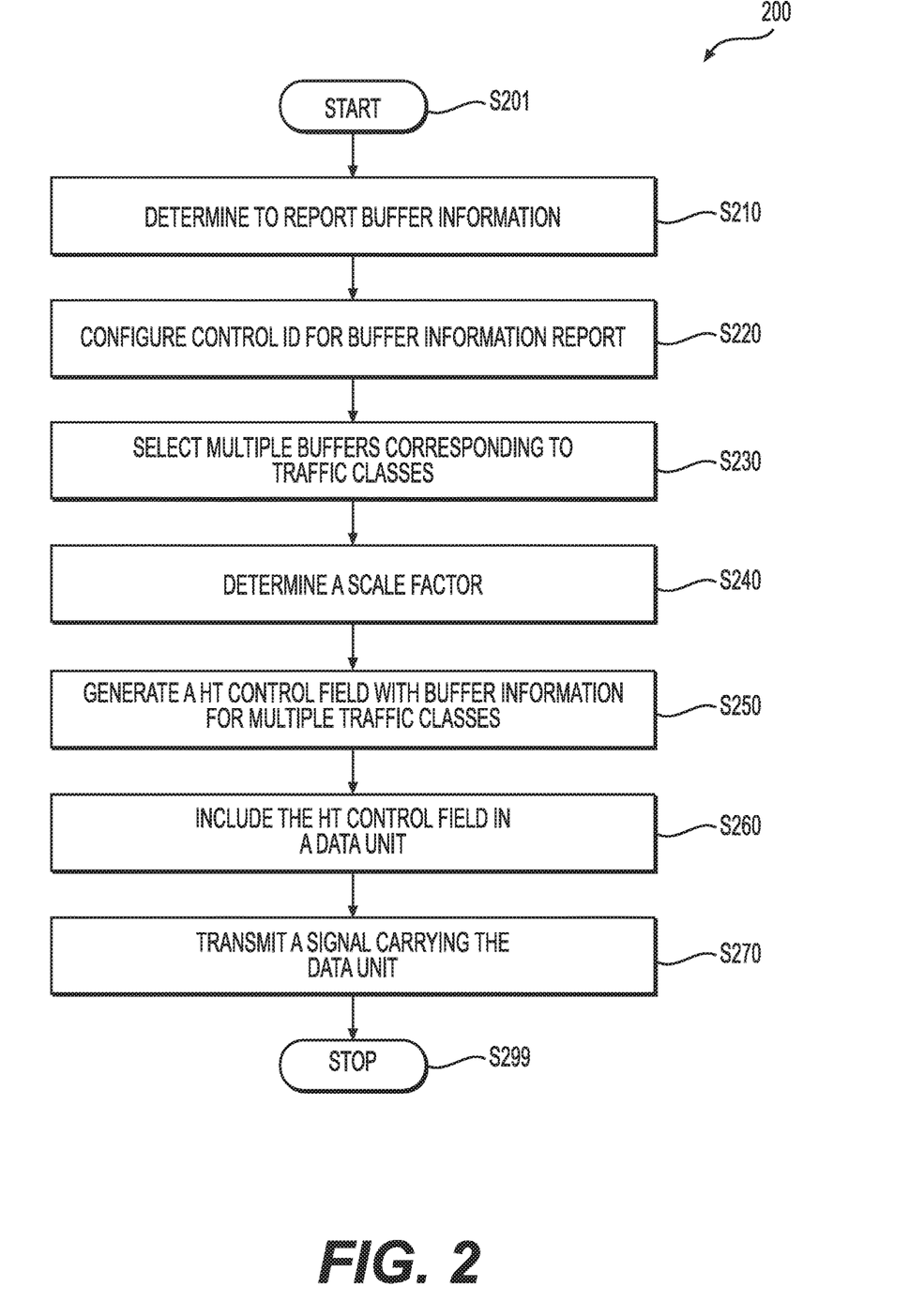
FIG. 2 shows a flow chart outlining a process 200 according to an embodiment of the disclosure.

FIG. 2 shows a flow chart outlining a process 200 according to an embodiment of the disclosure. In an example, the process 200 is executed by a second electronic device, such as the second electronic device 160a. The process starts at S201 and proceeds to S210.

At S210, a determination to report buffer information is made. In an example, the second electronic device 160a determines to report buffer information in response to a signal, such as a polling message, from the first electronic device 110. In another example, the second electronic device 160a initiates the buffer information report.

At S220, a control identifier (ID) or QoS Control field in MAC header of QoS Data/Null frame is configured to indicate buffer information report. In an example, a configurable field (e.g., HT control field) in a frame can be used for multiple purposes. The field includes one or more bits that are allocated for a control identifier that can be configured to indicate a specific purpose of the field in the frame.

At S230, buffers corresponding to traffic classes are selected to report. In an example, the second electronic device 160a determines traffic classes to report, and selects the buffers that buffer the traffic classes.

At S240, scale factors are determined for buffer information reports. In an example, a limited number of bits are used to report the length of buffered data, and different scale factors are used for different ranges and different resolutions. In the example, the second electronic device 160a determines the length of buffered data to report, and determines a scale factor based on the length, such that the limited number of bits can report the length with a relatively high resolution in an example.

At S250, the configurable control field (e.g., HT control field or QoS Control field) with buffer information reports for multiple traffic classes is generated. In an example, the second electronic device 160a generates the control field to include the control identifier and buffer information reports. Each buffer information report includes a scale factor and unscaled buffer information.

At S260, the configurable control field is included in a data unit. In an example, the second electronic device 160a generates a data unit with the configurable control field. In another example, the second electronic device 160a aggregates multiple data units to generate an aggregated data unit.

At S270, a signal carrying the data unit is transmitted. In an example, the second electronic device 160a generates wireless signals carrying the data unit to the first electronic device 110. The first electronic device 110 can perform operations, such as allocate transmission resources, select traffic classes, and the like based on the buffer information reports in the data unit. Then, the process proceeds to S299 and terminates.

FIG. 3 shows a diagram of a data unit example 300 according to an embodiment of the disclosure. In an example, the second electronic device 160a generates the data unit 300 to report buffer information for requesting transmission resource. The data unit 300 is a media access control (MAC) layer data unit, and is referred to as an MAC protocol data unit (MPDU) in an example. The data unit 300 includes a MAC header 310, frame body 311 and a frame check sequence (FCS) field 312 (4 octets). The MAC header 310 includes a frame control field 301 (2 octets), a duration field 302 (2 octets), address fields 303-305 (each of 6 octets), a sequence control field 306 (2 octets), an optional address field 306 (6 octets), a quality of service (QoS) control field 308 (2 octets), a high throughput (HT) control field 320 (4 octets) and the like.

Generally, in an example, the frame control field 301 identifies the frame type of the data unit 300, such as management frame, data frame, control frame and the like. In an example, the duration field 302 specifies a period in which the data unit 300 is to be transmitted. In an example, the address fields 303-306 identify destination address, source address, and access point address. In an example, the sequence control field 306 tracks sequence and/or fragment numbers. In an example, the FCS field 312 includes checksum for error checking.

In an embodiment, the QoS control field 308 and the HT control field 320 are configured to include resource request information. In an example, the QoS control field 308 uses a plurality of sub-fields, such as a traffic identifier (TID) sub-field, an end of service (EOSP) sub-field, an acknowledgement (ACK) policy sub-field, a reserved (RSVD) sub-field, and a transmit opportunity (TXOP) duration/queue length subfield. In an example, the TXOP duration/queue length subfield has eight bits and is used to carry buffer information, such as the length of buffered bytes for transmission.

In the FIG. 3 example, the HT control field 320 is configured to carry resource request information. For example, the HT control field 320 includes two bits (e.g., B0 and B1) that are used to indicate the usage of the HT control field 320. In the FIG. 3 example, the B0 and B1 are set to values to indicate that the HT control field 320 is used as high efficiency (HE) control, such as according to the 802.11ax standard. Further, the HT control field 320 includes a control ID sub-field 331 (e.g., 4 bits), a sub-field 340 (e.g., 13 bits), and a sub-field 370 (e.g., 13 bits). The control ID sub-field 331 indicates the type of information, such as buffer information report, available channel report, and the like, in the sub-fields 340 and 370. In the FIG. 3 example, the control ID sub-field 331 is configured to have values indicating that the sub-field 340 is a first buffer information report 340, and the sub-field 370 is a second buffer information report 370.

In an example, the first buffer information report 340 and the second buffer information report 370 are similarly configured. In the FIG. 3 example, the first buffer information report 340 includes a traffic identifier (TID) sub-field 341 and a buffer information sub-field 350. In an example, the TID sub-field 341 specifies a traffic identifier for a traffic class, and the buffer information sub-field 350 specifies the amount of buffered data in the traffic class. In an example, the traffic is classified according to priority levels. For example, a priority level of a traffic class is used as the traffic identifier for the traffic class.

Further, in the FIG. 3 example, the buffer information sub-field 350 includes a scale factor 351, and unscaled buffer information 352, thus the buffered traffic is calculated as a product of the scale factor and the unscaled buffer information. In an example, 1 bit is used for the scale factor 351 and 9 bits are used for the unscaled buffer information 352. For example, when the scale factor 351 is binary 0, the unscaled buffer information 352 is in the unit of 16 octets, thus the buffer information sub-field 350 is used to report traffic in the range from 0 to 8176 octets; when the scale factor 351 is binary 1, the unscaled buffer information 352 is in the unit of 2048 octets, thus the buffer information sub-field 350 is used to report traffic in the range from 0 to 1,048,636 octets.

In another example, 2 bits are used for the scale factor 351 and 8 bits are used for the unscaled buffer information 352. For example, when the scale factor 351 is binary "00", the unscaled buffer information 352 is in the unit of 8 octets, thus the buffer information sub-field 350 is used to report traffic in the range from 0 to 2040 octets; when the scale factor 351 is binary "01", the unscaled buffer information 352 is in the unit of 64 octets, thus the buffer information sub-field 350 is used to report traffic in the range from 64 to 16,384 octets; when the scale factor 351 is binary "10", the unscaled buffer information 352 is in the unit of 512 octets, thus the buffer information sub-field 350 is used to report traffic in the range from 512 to 131,072 octets; when the scale factor 351 is binary "11", the unscaled buffer information 352 is in the unit of 8,192 octets, thus the buffer information sub-field 350 is used to report traffic in the range from 8,192 to 2,097,152 octets. In another embodiment, 2 bits in QoS Control field are used for the scale factor and 6 bits are used for unscaled buffer information.

In an example, the first buffer information report 340 and the second buffer information report 370 are similarly configured. Thus, the data unit 300 is used to report buffer information for two traffic classes.

It is noted that, in an example, the frame body 311 is omitted, and the data unit 300 has no data payload, and is referred to as a null data frame or QoS null frame. In an embodiment, the null data frame is used as a control frame. For example, the second electronic devices 160a-160n use null data frames to provide control information to the first electronic device 110.

In an embodiment, the QoS control field 308 is configured to carry buffer information of a first traffic class which the data unit 300 belongs to, and the HT control field 320 is configured to carry buffer information of second and third traffic classes other than the first traffic class. In another embodiment, the QoS control field 308 is configured to carry buffer information of a first traffic class which the data unit 300 belongs to, the HT control field 320 is configured to carry buffer information of second traffic and third classes including the first traffic class, then the buffer information of the first traffic class in the HT control field 320 takes precedence over the buffer information in the QoS control field 308.

FIG. 4 shows a diagram of a data unit example 400 according to an embodiment of the disclosure. In an example, the second electronic device 160a generates the data unit 400 to report buffer information for resource request.

The data unit 400 includes fields and sub-fields that are similarly configured as the corresponding fields and sub-fields in the data unit 300. The description of these fields and sub-fields has been provided above and will be omitted here for clarity purposes.

However, in the FIG. 4 example, the first buffer information report sub-field 440 includes a single TID indicator 441, a TID sub-field 445 and a buffer information sub-field 450. In an example, the single TID indicator 441 includes 1 bit and the bit is used to indicate whether the first buffer information report is for a single traffic class, or multiple traffic classes. For example, when the single TID indicator 441 has binary 1, the TID sub-field 445 and the buffer information sub-field 450 are used for a single traffic class. In an example, the TID sub-field 445 specifies a traffic identifier for the single traffic class, and the buffer information sub-field 450 specifies the amount of buffered data in the single traffic class for transmission.

When the single TID indicator 441 has binary 0, the TID sub-field 445 and the buffer information sub-field 450 are used for multiple traffic classes. For example, the TID sub-field 445 is reserved to identify the multiple traffic classes. In an example, the TID sub-field 445 can be used to identify one or more access categories (ACs) of the traffic classes. The buffer information sub-field 450 specifies the amount of buffered data in the multiple traffic classes.

Further, in the FIG. 4 example, the buffer information sub-field 450 includes a scale factor 451, and unscaled buffer information 452, thus the buffered traffic is calculated as a product of the scale factor and the unscaled buffer information. In an example, 1 bit is used for the scale factor 451 and 8 bits are used for the unscaled buffer information 452. For example, when the scale factor 451 is binary 0, the unscaled buffer information 452 is in the unit of 32 octets, thus the buffer information sub-field 450 is used to report traffic in the range from 0 to 8160 octets; when the scale factor 451 is binary 1, the unscaled buffer information 452 is in the unit of 4096 octets, thus the buffer information sub-field 450 is used to report traffic in the range from 4096 to 1,048,636 octets.

In another example, 2 bits are used for the scale factor 451 and 7 bits are used for the unscaled buffer information 452. For example, when the scale factor 451 is binary "00", the unscaled buffer information 452 is in the unit of 8 octets, thus the buffer information sub-field 450 is used to report traffic in the range from 0 to 1016 octets; when the scale factor 451 is binary "01", the unscaled buffer information 452 is in the unit of 64 octets, thus the buffer information sub-field 450 is used to report traffic in the range from 64 to 8,192 octets; when the scale factor 451 is binary "10", the unscaled buffer information 452 is in the unit of 512 octets, thus the buffer information sub-field 450 is used to report traffic in the range from 512 to 65,536 octets; when the scale factor 451 is binary "11", the unscaled buffer information 452 is in the unit of 8,192 octets, thus the buffer information sub-field 450 is used to report traffic in the range from 8,192 to 1,048,536 octets.

In an example, the first buffer information report 440 and the second buffer information report 470 are similarly configured. In another example, the second buffer information report 470 is configured similarly as the first buffer information report 340 in the FIG. 3 example.

It is noted that, in an example, the frame body 411 is omitted, and the data unit 400 has no data payload, and is referred to as a null data frame or QoS null frame. In an embodiment, the null data frame is used as a control frame. For example, the second electronic devices 160*a*-160*n* use null data frames to provide control information to the first electronic device 110.

FIG. 5 shows a diagram of an aggregated data unit example 500 according to an embodiment of the disclosure. In an example, the second electronic device 160*a* generates the aggregated data unit 500. The aggregated data unit 500 is an MAC layer data unit, and is referred to as an aggregated MPDU (A-MPDU) in an example.

The aggregated data unit 500 includes multiple sub-frames, such as a first sub-frame 510 and a second sub-frame 520 in the FIG. 5. A sub-frame includes a delimiter, an MPDU and padding. For example, the first sub-frame 510 includes a first delimiter 511, a first MPDU 512 and a first padding 513, and the second sub-frame 520 includes a second delimiter 521, a second MPDU 522 and a second padding 523.

In an embodiment, the multiple data units in the aggregated data unit 500, such as the first MPDU 512 and the second MPDU 522, can have any suitable formats. In an example, the second electronic device 160*a* generates the aggregated data unit 500 with both the first MPDU 512 and the second MPDU 522 being QoS null frames. In an example, the first MPDU 512 and the second MPDU 522 are configured to carry buffer information for different traffic classes. In an example, the first MPDU 512 and the second MPDU 522 have different traffic identifiers (TIDs), so the QoS Control fields of the first MPDU 512 and the second MPDU 522 have different buffer information for different traffic classes. In an embodiment, the first electronic device 110 uses multiple-STA block acknowledgement (M-BA) to acknowledge the received QoS null frames with different TIDs. For example, the M-BA includes a first indication that indicates a receiving success of the first MPDU 512 having a first TID, and includes a second indication that indicates a receiving success of the second MPDU 522 having a second TID. In another embodiment, the first electronic device 110 does not acknowledge the received QoS null frames with different TIDs.

FIG. 6 shows a diagram 600 for traffic selection according to an embodiment of the disclosure. The diagram shows a table 610 for traffic classification. In the FIG. 6 example, four access categories are defined. The four access categories correspond to communication sessions for voice applications (VOICE), communication sessions for video applications (VIDEO), communication sessions for applications where best effort communications are sufficient (BEST EFFORT), and communication sessions for applications where background communications are sufficient (BACKGROUND).

Further, in the FIG. 6 example, for each access category, two priority levels share the access category. Each of the eight priority levels is addressable using a three-bit word in an example. In an embodiment, traffic is classified and buffered according to the priority levels, and the priority levels are used as traffic identifiers (TIDs) in an example.

According to an aspect of the disclosure, downlink and uplink transmissions using A-MPDU include traffic from a primary access category and/or a secondary access category. In an embodiment, a multiple-user transmission opportunity is acquired through enhanced distributed channel access (EDCA), the AP device/the STA devices can select different traffic classes for different STA devices. In an embodiment, each access category has a corresponding backoff counter. In the embodiment, when a specific backoff counter counts down to zero during the EDCA, the length of the multiple-user transmission opportunity is defined by the access category corresponding to the specific backoff counter. In the embodiment, when two or more backoff counters count down to zero at the same time, then among the access categories corresponding to the two or more backoff counters, the access category with the highest priority is selected, the length of the multiple-user transmission opportunity is defined by the access category with the highest priority.

In another embodiment, a multiple-user transmission opportunity is acquired through target wake time (TWT), then the length of the multiple-user transmission opportunity is defined based on the TWT service period.

In an embodiment, the AP device decides the primary access category for downlink transmission or uplink transmission. In an example, the AP device or an STA device generates single TID A-MPDU based on the primary access category, such as an A-MPDU 620 in FIG. 6. When no MPDU is available from the primary access category (e.g., buffers for the primary access category are empty), in an example, the AP device or the STA device determines a secondary access category. Then, the AP device or an STA device generates single TID A-MPDU based on the secondary access category, such as an A-MPDU 630 in FIG. 6. In another embodiment, an STA device has the final decision about the traffic identifier of the aggregated MPDUs in single TID A-MPDU.

In an example, when multiple-TID A-MPDU is allowable, the AP device or the STA device aggregates MPDU from primary access category first in an A-MPDU. When the A-MPDU has remaining space, the AP device or the STA device determines a secondary access category, and aggregates MPDU from the secondary access category in the A-MPDU, such as an A-MPDU 640 in FIG. 6. In another embodiment, an STA device has the final decision about the traffic identifiers of the aggregated MPDUs in multiple-TID A-MPDU.

According to an aspect of the disclosure, when the AP device fails to receives multiple-user block acknowledgements, the AP device aggregates block acknowledgment request (BAR) frames in an A-MPDU or VHT single MPDU, and transmit signals carrying the A-MPDU or the VHT single MPDU.

FIG. 7 shows examples of A-MPDU 710-730 according to embodiment of the disclosure.

The A-MPDU 710 includes multiple BAR frames 712 and 715. In an example, each of the BAR frames 712 and 715 request block acknowledgement of different TIDs.

It is noted that A-MPDU 710 can include or not include other suitably frames, such as data frames, management frames, and the like. In an example, the A-MPDU 710 includes a trigger frame 718. In another example, the A-MPDU 710 does not include the trigger frame 718.

The A-MPDU 720 includes a multi-TID BAR frame 722. In an example, multi-TID BAR frame 722 requests block acknowledgement of multiple TIDs.

It is noted that A-MPDU 720 can include or not include other suitably frames, such as data frames, management frames, and the like. In an example, the A-MPDU 720 includes a trigger frame 728. In another example, the A-MPDU 720 does not include the trigger frame 728.

The A-MPDU 730 includes a trigger frame 732. The trigger frame includes a specific field that carries block acknowledgement request of multiple TIDs.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An access point device, comprising:
  a transceiver configured to transmit and receive wireless signals to and from a plurality of
  client station devices that form a basic service set (BSS) with the access point device; and
  a processing circuit configured to determine whether the BSS should operate in a scheduled operation mode or a non-scheduled operation mode, and announce the determined operation mode to the client station devices, wherein transmissions between the access point device and the BSS are scheduled in the scheduled operation mode, and the transmissions between the access point device and the BSS are not scheduled in the non-scheduled operation mode, wherein a client station device of the BSS enters a low priority enhanced distributed channel access (EDCA) state to decrease chances to transmit when the client station device is scheduled by the access point device in multi-user transmissions and wherein a client station device of the BSS enters a high priority enhanced distributed channel access (EDCA) state to increase chances to transmit when the client station device is not scheduled by the access point device in multi-user transmissions.

2. The access point device according to claim 1, wherein the BSS are configured to perform wireless communications in a central coordinated manner and enable multi-user (MU) downlink and/or uplink transmissions.

3. The access point device according to claim 2, wherein the processing circuit is further configured to coordinate the MU downlink and/or uplink transmissions between the access point device and the BSS.

4. The access point device according to claim 1, wherein the processing circuit is further configured to assign resources of a communication channel for transmissions between the access point device and the BSS.

5. The access point device according to claim 1, wherein the client station device with the low priority EDCA state is allowed to transmit data units using a high priority EDCA when the data units include management frames for at least one of a voice access and a block acknowledgement request.

6. The access point device according to claim 1, wherein the client station device with the high priority EDCA state uses an enhanced distributed channel access to gain a transmission chance based on traffic classes.

7. The access point device according to claim 1, wherein the processing circuit is further configured to determine whether the BSS should operate in the scheduled operation mode or the non-scheduled operation mode based on an amount of load on the BSS.

8. The access point device according to claim 1, wherein the scheduled operation mode is selected when the amount of load on the BSS is high and the non-scheduled operation mode is selected when the amount of load on the BSS is low.

9. A method for wireless communication, the method comprising:
  transmitting and receiving wireless signals, by an access point device, to and from a plurality
  of client station devices that form a basic service set (BSS) with the access point device;
  determining, by the access point device, whether the BSS should operate in a scheduled operation mode or a non-scheduled operation mode;
  announcing the determined operation mode to the client station devices, wherein transmissions between the access point device and the BSS are scheduled in the scheduled operation mode, and the transmissions between the access point device and the BSS are not scheduled in the non-scheduled operation mode; and
  entering, by a client station device of the BSS, a low priority enhanced distributed channel access (EDCA) state to decrease chances to transmit when the client station device is scheduled by the access point device in multi-user transmissions and a high priority enhanced distributed channel access (EDCA) state to increase chances to transmit when the client station device is not scheduled by the access point device in multi-user transmissions.

10. The method for wireless communication according to claim 9, further comprising:
  performing, by the BSS, wireless communications in a central coordinated manner; and
  enabling multi-user (MU) downlink and/or uplink transmissions.

11. The method for wireless communication according to claim 9, further comprising:
  assigning, by the access point device, resources of a communication channel for transmissions between the access point device and the BSS.

12. The method for wireless communication according to claim 10, further comprising:
  coordinating, by the access point device, the MU downlink and/or uplink transmissions between the access point device and the BSS.

13. The method for wireless communication according to claim 9, further comprising:
  allowing the client station device with the low priority EDCA state to transmit data units using a high priority EDCA when the data units include management frames for at least one of a voice access and a block acknowledgement request.

14. The method for wireless communication according to claim 9, further comprising:
  using, by the client station device with the high priority EDCA state, an enhanced distributed channel access to gain a transmission chance based on traffic classes.

15. The method for wireless communication according to claim 9, further comprising:
- determining, by the access point device, whether the BSS should operate in the scheduled operation mode or the non-scheduled operation mode based on an amount of load on the BSS.

16. The method for wireless communication according to claim 9, further comprising:
- selecting, by the access point device, the scheduled operation mode when the amount of load on the BSS is high; and
- selecting, by the access point device, the non-scheduled operation mode when the amount of load on the BSS is low.

* * * * *